(12) United States Patent
Goodrich et al.

(10) Patent No.: US 12,105,283 B2
(45) Date of Patent: Oct. 1, 2024

(54) CONVERSATION INTERFACE ON AN EYEWEAR DEVICE

(71) Applicant: Snap Inc., Santa Monica, CA (US)

(72) Inventors: Kyle Goodrich, Venice, CA (US); Andrew James McPhee, Culver City, CA (US); Daniel Moreno, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/445,772

(22) Filed: Aug. 24, 2021

(65) Prior Publication Data
US 2022/0197027 A1    Jun. 23, 2022

Related U.S. Application Data

(60) Provisional application No. 63/129,235, filed on Dec. 22, 2020.

(51) Int. Cl.
*G06F 3/04815* (2022.01)
*G02B 27/01* (2006.01)
(Continued)

(52) U.S. Cl.
CPC ........... *G02B 27/017* (2013.01); *G06F 3/017* (2013.01); *G06F 3/04815* (2013.01); *H04L 51/04* (2013.01); *G02B 2027/0178* (2013.01)

(58) Field of Classification Search
CPC .......... G02B 27/017; G02B 2027/0178; G02B 2027/0138; G02B 2027/014; G06F 3/017;
(Continued)

(56) References Cited

U.S. PATENT DOCUMENTS 6,750,890 B1   6/2004  Sugimoto et al.
7,971,156 B2   6/2011  Albertson et al.
(Continued)

FOREIGN PATENT DOCUMENTS

CN    103049761 B       8/2016
CN    109885367 A  *    6/2019
(Continued)

OTHER PUBLICATIONS

"U.S. Appl. No. 17/410,814, Non Final Office Action mailed Jan. 12, 2022", 22 pgs.
(Continued)

*Primary Examiner* — Temesghen Ghebretinsae
*Assistant Examiner* — Karin Kiyabu
(74) *Attorney, Agent, or Firm* — Schwegman Lundberg & Woessner, P.A.

(57) ABSTRACT

Systems and methods are provided for performing operations comprising: receiving a request to access a conversation interface; in response to receiving the request, retrieving a plurality of virtual conversation objects associated with the conversation interface; displaying a first virtual conversation object of the plurality of virtual conversation objects at a first location in three-dimensional space; determining that a second virtual conversation object of the plurality of virtual conversation objects is associated with an earlier timestamp than the first virtual conversation object; and in response to determining that the second virtual conversation object is associated with the earlier timestamp than the first virtual conversation object, displaying the second virtual conversation object at a second location in three-dimensional space that is closer to a user of an eyewear device than the first location.

21 Claims, 11 Drawing Sheets

(51) Int. Cl.
*G06F 3/01* (2006.01)
*H04L 51/04* (2022.01)

(58) Field of Classification Search
CPC .... G06F 3/04815; G06F 3/0481; G06F 1/163; G06F 3/011; G06F 3/012; G06F 3/0482; H04L 51/04; H04L 51/216; H04L 51/56; H04L 51/046
See application file for complete search history.

(56) References Cited

U.S. PATENT DOCUMENTS

| | | | |
|---|---|---|---|
| 7,996,793 | B2 | 8/2011 | Latta et al. |
| 8,487,938 | B2 | 7/2013 | Latta et al. |
| 8,856,691 | B2 | 10/2014 | Geisner et al. |
| 8,971,572 | B1 | 3/2015 | Yin et al. |
| 9,225,897 | B1 | 12/2015 | Sehn |
| 9,230,160 | B1 | 1/2016 | Kanter |
| 9,270,811 | B1 | 2/2016 | Atlas |
| 9,276,886 | B1 | 3/2016 | Samaranayake |
| 9,292,082 | B1 | 3/2016 | Patel et al. |
| 9,705,831 | B2 | 7/2017 | Spiegel |
| 9,742,713 | B2 | 8/2017 | Spiegel et al. |
| 9,977,523 | B2 | 5/2018 | Kim et al. |
| 10,061,352 | B1 | 8/2018 | Trail |
| 10,102,423 | B2 | 10/2018 | Shaburov et al. |
| 10,261,595 | B1 | 4/2019 | Kin |
| 10,284,508 | B1 | 5/2019 | Allen et al. |
| 10,289,660 | B2 | 5/2019 | Karunamuni et al. |
| 10,402,081 | B1 | 9/2019 | Andersen et al. |
| 10,439,972 | B1 | 10/2019 | Spiegel et al. |
| 10,509,466 | B1 | 12/2019 | Miller et al. |
| 10,514,876 | B2 | 12/2019 | Sehn |
| 10,551,937 | B2 | 2/2020 | Dash |
| 10,579,869 | B1 | 3/2020 | Xiong et al. |
| 10,591,730 | B2 | 3/2020 | Rodriguez, II et al. |
| 10,614,855 | B2 | 4/2020 | Huang |
| 10,748,347 | B1 | 8/2020 | Li et al. |
| 10,957,059 | B1 | 3/2021 | Katz et al. |
| 10,958,608 | B1 | 3/2021 | Allen et al. |
| 10,962,809 | B1 | 3/2021 | Castañeda |
| 10,996,846 | B2 | 5/2021 | Robertson et al. |
| 10,997,787 | B2 | 5/2021 | Ge et al. |
| 11,012,390 | B1 | 5/2021 | Al Majid et al. |
| 11,030,454 | B1 | 6/2021 | Xiong et al. |
| 11,036,368 | B1 | 6/2021 | Al Majid et al. |
| 11,062,498 | B1 | 7/2021 | Voss et al. |
| 11,087,728 | B1 | 8/2021 | Canberk et al. |
| 11,092,998 | B1 | 8/2021 | Castañeda et al. |
| 11,106,342 | B1 | 8/2021 | Al Majid et al. |
| 11,126,206 | B2 | 9/2021 | Meisenholder et al. |
| 11,143,867 | B2 | 10/2021 | Rodriguez, II |
| 11,169,600 | B1 | 11/2021 | Canberk et al. |
| 11,227,626 | B1 | 1/2022 | Krishnan et al. |
| 11,249,556 | B1 | 2/2022 | Schwarz et al. |
| 11,307,747 | B2 | 4/2022 | Dancie et al. |
| 11,340,756 | B2 | 5/2022 | Faulkner et al. |
| 11,531,402 | B1 | 12/2022 | Stolzenberg |
| 11,546,505 | B2 | 1/2023 | Canberk |
| 11,782,577 | B2 | 10/2023 | Goodrich et al. |
| 11,797,162 | B2 | 10/2023 | Goodrich et al. |
| 2003/0090524 | A1 | 5/2003 | Segerberg et al. |
| 2003/0154300 | A1* | 8/2003 | Mostafa .............. H04W 4/12 709/231 |
| 2004/0203956 | A1* | 10/2004 | Tsampalis ........... H04W 88/02 455/466 |
| 2004/0233238 | A1 | 11/2004 | Lahdesmaki |
| 2005/0108392 | A1 | 5/2005 | Glasser et al. |
| 2005/0160451 | A1* | 7/2005 | Batra ............... H04N 21/42204 348/E5.103 |
| 2005/0210410 | A1 | 9/2005 | Ohwa |
| 2006/0001650 | A1 | 1/2006 | Robbins et al. |
| 2007/0150830 | A1 | 6/2007 | Ording et al. |
| 2008/0114850 | A1* | 5/2008 | Skog ................. H04L 65/1069 709/227 |
| 2009/0012788 | A1 | 1/2009 | Gilbert et al. |
| 2010/0125811 | A1* | 5/2010 | Moore ................ H04M 1/7243 715/846 |
| 2010/0289740 | A1 | 11/2010 | Kim et al. |
| 2011/0292177 | A1* | 12/2011 | Sakurai ............... H04N 13/398 348/E13.02 |
| 2011/0301934 | A1 | 12/2011 | Tardif |
| 2012/0236031 | A1 | 9/2012 | Haddick et al. |
| 2012/0249416 | A1 | 10/2012 | Maciocci et al. |
| 2013/0016070 | A1 | 1/2013 | Starner et al. |
| 2013/0088455 | A1 | 4/2013 | Jeong |
| 2013/0254695 | A1 | 9/2013 | Lambourne et al. |
| 2014/0053086 | A1 | 2/2014 | Kim et al. |
| 2014/0055343 | A1 | 2/2014 | Kim |
| 2014/0115114 | A1 | 4/2014 | Garmark et al. |
| 2014/0171036 | A1 | 6/2014 | Simmons |
| 2014/0201666 | A1 | 7/2014 | Bedikian et al. |
| 2014/0289676 | A1 | 9/2014 | Yoritate et al. |
| 2014/0375683 | A1 | 12/2014 | Salter et al. |
| 2015/0078586 | A1 | 3/2015 | Ang et al. |
| 2015/0085058 | A1 | 3/2015 | Zhang et al. |
| 2015/0103021 | A1 | 4/2015 | Lim et al. |
| 2015/0120293 | A1 | 4/2015 | Wohlert et al. |
| 2015/0186002 | A1 | 7/2015 | Suzuki et al. |
| 2015/0187357 | A1 | 7/2015 | Xia et al. |
| 2015/0271120 | A1* | 9/2015 | Langholz ............. H04L 51/216 709/206 |
| 2015/0287403 | A1 | 10/2015 | Holzer Zaslansky et al. |
| 2015/0309316 | A1 | 10/2015 | Osterhout et al. |
| 2015/0324645 | A1 | 11/2015 | Jang et al. |
| 2015/0370320 | A1 | 12/2015 | Connor |
| 2016/0092035 | A1* | 3/2016 | Crocker ................ H04L 51/52 715/752 |
| 2016/0113550 | A1 | 4/2016 | Martin |
| 2016/0162531 | A1* | 6/2016 | Beattie, Jr. ............ H04W 4/14 707/609 |
| 2016/0189315 | A1 | 6/2016 | Anania et al. |
| 2016/0320853 | A1 | 11/2016 | Lien et al. |
| 2017/0046058 | A1 | 2/2017 | Karunamuni et al. |
| 2017/0090747 | A1 | 3/2017 | Dash |
| 2017/0097687 | A1 | 4/2017 | Pinault et al. |
| 2017/0111723 | A1 | 4/2017 | Boesen |
| 2017/0123487 | A1 | 5/2017 | Hazra et al. |
| 2017/0195736 | A1 | 7/2017 | Chai et al. |
| 2017/0195739 | A1 | 7/2017 | Wessel |
| 2017/0228130 | A1 | 8/2017 | Palmaro |
| 2017/0236197 | A1* | 8/2017 | Acken ................ G06Q 30/0643 705/26.81 |
| 2017/0277684 | A1 | 9/2017 | Dharmarajan Mary |
| 2017/0277685 | A1 | 9/2017 | Takumi |
| 2017/0287225 | A1* | 10/2017 | Powderly ............ G06F 3/04815 |
| 2017/0351910 | A1 | 12/2017 | Elwazer et al. |
| 2018/0005429 | A1* | 1/2018 | Osman ................. A63F 13/56 |
| 2018/0046245 | A1* | 2/2018 | Schwarz ............ G02B 27/0093 |
| 2018/0062691 | A1 | 3/2018 | Barnett, Jr. |
| 2018/0067914 | A1 | 3/2018 | Chen et al. |
| 2018/0075658 | A1 | 3/2018 | Lanier et al. |
| 2018/0101986 | A1 | 4/2018 | Burns et al. |
| 2018/0107276 | A1 | 4/2018 | Heubel et al. |
| 2018/0158370 | A1 | 6/2018 | Pryor |
| 2018/0321826 | A1 | 11/2018 | Bereza et al. |
| 2018/0329209 | A1 | 11/2018 | Nattukallingal |
| 2018/0335930 | A1* | 11/2018 | Scapel ................. G06V 40/176 |
| 2018/0343023 | A1 | 11/2018 | Park et al. |
| 2019/0019508 | A1* | 1/2019 | Rochford .............. G06F 3/013 |
| 2019/0052587 | A1* | 2/2019 | Andreou .............. H04L 51/066 |
| 2019/0114802 | A1* | 4/2019 | Lazarow .............. H04W 56/001 |
| 2019/0146219 | A1 | 5/2019 | Rodriguez, II |
| 2019/0172262 | A1 | 6/2019 | McHugh et al. |
| 2019/0179405 | A1* | 6/2019 | Sun ..................... G06F 1/1686 |
| 2019/0187765 | A1 | 6/2019 | Ashwood et al. |
| 2019/0188918 | A1* | 6/2019 | Brewer ................ G06T 19/006 |
| 2019/0205010 | A1 | 7/2019 | Fujii et al. |
| 2019/0310757 | A1* | 10/2019 | Lee .................... G06F 3/017 |
| 2019/0340799 | A1 | 11/2019 | Dryer et al. |
| 2019/0342507 | A1* | 11/2019 | Dye .................... G06T 13/40 |
| 2019/0362557 | A1* | 11/2019 | Lacey ................. G06T 5/20 |
| 2019/0369839 | A1* | 12/2019 | Yang .................. G06F 3/017 |
| 2020/0034033 | A1* | 1/2020 | Chaudhri ............ H04L 51/04 |

(56) References Cited

U.S. PATENT DOCUMENTS

| | | |
|---|---|---|
| 2020/0042095 A1 | 2/2020 | Ang et al. |
| 2020/0104039 A1 | 4/2020 | Robertson et al. |
| 2020/0142497 A1 | 5/2020 | Zhu et al. |
| 2020/0201514 A1 | 6/2020 | Murphy et al. |
| 2020/0226835 A1 | 7/2020 | Farchy et al. |
| 2020/0301575 A1 | 9/2020 | Lindholm et al. |
| 2020/0348767 A1 | 11/2020 | Araújo et al. |
| 2020/0387286 A1 | 12/2020 | Ravasz et al. |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0200324 A1 | 7/2021 | Doganis |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2021/0405772 A1 | 12/2021 | Canberk et al. |
| 2022/0188539 A1 | 6/2022 | Chan et al. |
| 2022/0197393 A1 | 6/2022 | Goodrich et al. |
| 2022/0197446 A1 | 6/2022 | Goodrich et al. |
| 2022/0197485 A1 | 6/2022 | Goodrich et al. |
| 2022/0198603 A1 | 6/2022 | Goodrich et al. |
| 2022/0206588 A1 | 6/2022 | Canberk et al. |
| 2022/0300730 A1 | 9/2022 | Eirinberg et al. |
| 2022/0300731 A1 | 9/2022 | Eirinberg et al. |
| 2022/0301231 A1 | 9/2022 | Eirinberg et al. |
| 2022/0326781 A1 | 10/2022 | Hwang et al. |
| 2022/0334649 A1 | 10/2022 | Hwang et al. |
| 2022/0375174 A1 | 11/2022 | Arya et al. |
| 2022/0382377 A1 | 12/2022 | Hosseinkhani Loorak et al. |
| 2022/0397989 A1* | 12/2022 | Catalano ............... G06F 8/61 |
| 2023/0067305 A1* | 3/2023 | Assa ............... G06F 40/295 |
| 2023/0300292 A1* | 9/2023 | Barbosa da Silva ...................... H04L 12/1827 348/14.07 |
| 2023/0400965 A1 | 12/2023 | Goodrich et al. |
| 2024/0012549 A1 | 1/2024 | Goodrich et al. |

FOREIGN PATENT DOCUMENTS

| | | | |
|---|---|---|---|
| CN | 116635771 | | 8/2023 |
| CN | 116670632 A | | 8/2023 |
| CN | 116685938 A | | 9/2023 |
| CN | 116724286 A | | 9/2023 |
| CN | 116802590 A | | 9/2023 |
| EP | 3707693 A1 | | 9/2020 |
| EP | 4172726 A1 | | 5/2023 |
| EP | 4172730 A1 | | 5/2023 |
| JP | 2018032329 A | * | 3/2018 |
| KR | 20220158824 A | | 12/2022 |
| WO | WO-2009137419 A2 | | 11/2009 |
| WO | WO-2015192117 A1 | | 12/2015 |
| WO | WO-2016168591 A1 | | 10/2016 |
| WO | WO-2019094618 A1 | | 5/2019 |
| WO | WO-2021206578 A1 * | 10/2021 | ............ G06F 16/40 |
| WO | WO-2022005687 A1 | | 1/2022 |
| WO | WO-2022005693 A1 | | 1/2022 |
| WO | WO-2022060549 A2 | | 3/2022 |
| WO | WO-2022066578 A1 | | 3/2022 |
| WO | WO-2022067254 A1 * | 3/2022 | ........... G06F 3/0482 |
| WO | WO-2022060549 A3 | | 4/2022 |
| WO | WO-2022131784 A1 * | 6/2022 | ............. G06F 3/011 |
| WO | WO-2022132381 A1 | | 6/2022 |
| WO | WO-2022140113 A1 | | 6/2022 |
| WO | WO-2022140117 A1 | | 6/2022 |
| WO | WO-2022140129 A1 | | 6/2022 |
| WO | WO-2022140734 A1 | | 6/2022 |
| WO | WO-2022140739 A1 | | 6/2022 |
| WO | WO-2022146678 A1 | | 7/2022 |
| WO | WO-2022198182 A1 | | 9/2022 |
| WO | WO-2022216784 A1 | | 10/2022 |
| WO | WO-2022225761 A1 | | 10/2022 |
| WO | WO-2022245765 A1 | | 11/2022 |

OTHER PUBLICATIONS

"U.S. Appl. No. 17/410,787, Non Final Office Action mailed Aug. 17, 2022", 15 pgs.
"U.S. Appl. No. 17/410,814, Advisory Action mailed Aug. 30, 2022", 4 pgs.
"U.S. Appl. No. 17/410,814, Final Office Action mailed Jun. 7, 2022", 21 pgs.
"U.S. Appl. No. 17/410,814, Response filed Mar. 30, 2022 to Non Final Office Action mailed Jan. 12, 2022", 13 pgs.
"U.S. Appl. No. 17/410,814, Response filed Aug. 5, 2022 to Final Office Action mailed Jun. 7, 2022", 11 pgs.
"U.S. Appl. No. 17/445,767, Non Final Office Action mailed Sep. 9, 2022", 25 pgs.
"U.S. Appl. No. 17/445,774, Non Final Office Action mailed Jul. 13, 2022", 26 pgs.
"International Application Serial No. PCT/US2021/063307, International Search Report mailed May 12, 2022", 6 pgs.
"International Application Serial No. PCT/US2021/063307, Invitation to Pay Additional Fees mailed Mar. 21, 2022", 12 pgs.
"International Application Serial No. PCT/US2021/063307, Written Opinion mailed May 12, 2022", 10 pgs.
"International Application Serial No. PCT/US2021/063350, International Search Report mailed Apr. 5, 2022", 4 pgs.
"International Application Serial No. PCT/US2021/063350, Written Opinion mailed Apr. 5, 2022", 5 pgs.
"International Application Serial No. PCT/US2021/063553, International Search Report mailed Mar. 18, 2022", 4 pgs.
"International Application Serial No. PCT/US2021/063553, Written Opinion mailed Mar. 18, 2022", 8 pgs.
"International Application Serial No. PCT/US2021/072864, International Search Report mailed Mar. 29, 2022", 4 pgs.
"International Application Serial No. PCT/US2021/072864, Written Opinion mailed Mar. 29, 2022", 7 pgs.
"International Application Serial No. PCT/US2021/072959, International Search Report mailed Apr. 5, 2022", 5 pgs.
"International Application Serial No. PCT/US2021/072959, Written Opinion mailed Apr. 5, 2022", 7 pgs.
"Skype for Business User Guide", Information Services, Heriot-Watt University, UK, [Online] Retrieved from the Internet: <URL:https://www.hw.ac.uk/services/docs/is/skypeforbusinessuserguidev2.0.pdf>, [retrieved on Apr. 12, 2022], (2019), 16 pgs.
"U.S. Appl. No. 17/410,787, Corrected Notice of Allowability mailed Jan. 11, 2023", 2 pgs.
"U.S. Appl. No. 17/410,787, Notice of Allowance mailed Dec. 29, 2022", 12 pgs.
"U.S. Appl. No. 17/410,787, Response filed Nov. 4, 2022 to Non Final Office Action mailed Aug. 17, 2022", 9 pgs.
"U.S. Appl. No. 17/410,814, Final Office Action mailed Feb. 8, 2023", 24 pgs.
"U.S. Appl. No. 17/410,814, Non Final Office Action mailed Oct. 3, 2022", 21 pgs.
"U.S. Appl. No. 17/410,814, Response filed Dec. 30, 2022 to Non Final Office Action mailed Oct. 3, 2022", 11 pgs.
"U.S. Appl. No. 17/445,767, Final Office Action mailed Feb. 9, 2023", 26 pgs.
"U.S. Appl. No. 17/445,767, Response filed Dec. 7, 2022 to Non Final Office Action mailed Sep. 9, 2022", 11 pgs.
"U.S. Appl. No. 17/445,774, Final Office Action mailed Dec. 22, 2022", 29 pgs.
"U.S. Appl. No. 17/445,774, Response filed Oct. 12, 2022 to Non Final Office Action mailed Jul. 13, 2022", 12 pgs.
Wang, Wallace, "Mac OS X for Absolute Beginners", Apress, (2016), 507 pgs.
"U.S. Appl. No. 17/410,814, Advisory Action mailed Apr. 17, 2023", 5 pgs.
"U.S. Appl. No. 17/410,814, Notice of Allowance mailed May 25, 2023", 11 pgs.

(56) References Cited

OTHER PUBLICATIONS

"U.S. Appl. No. 17/410,814, Response filed Apr. 6, 2023 to Final Office Action mailed Feb. 8, 2023", Response to Final Office Action, 13 pgs.

"U.S. Appl. No. 17/410,814, Response filed Apr. 19, 2023 to Advisory Action mailed Apr. 17, 2023", 13 pgs.

"U.S. Appl. No. 17/445,767, Advisory Action mailed Mar. 17, 2023", 2 pgs.

"U.S. Appl. No. 17/445,767, Non Final Office Action mailed Jun. 1, 2023", 25 pgs.

"U.S. Appl. No. 17/445,767, Response filed Mar. 7, 2023 to Non Final Office Action mailed Sep. 9, 2022", 10 pgs.

"U.S. Appl. No. 17/445,774, Advisory Action mailed Mar. 9, 2023", 6 pgs.

"U.S. Appl. No. 17/445,774, Response filed Feb. 22, 2023 to Final Office Action mailed Dec. 22, 2022", 10 pgs.

"U.S. Appl. No. 17/445,774, Notice of Allowance mailed Jun. 22, 2023", 20 pgs.

"U.S. Appl. No. 17/410,814, Supplemental Notice of Allowability mailed Jun. 29, 2023", 8 pgs.

"U.S. Appl. No. 17/445,774, Corrected Notice of Allowability mailed Jul. 6, 2023", 2 pgs.

"International Application Serial No. PCT/US2021/072864, International Preliminary Report on Patentability mailed Jul. 6, 2023", 9 pgs.

"International Application Serial No. PCT/US2021/063307, International Preliminary Report on Patentability mailed Jul. 6, 2023", 12 pgs.

"International Application Serial No. PCT/US2021/063350, International Preliminary Report on Patentability mailed Jul. 6, 2023", 7 pgs.

"International Application Serial No. PCT/US2021/063553, International Preliminary Report on Patentability mailed Jul. 6, 2023", 10 pgs.

"International Application Serial No. PCT/US2021/072959, International Preliminary Report on Patentability mailed Jul. 6, 2023", 9 pgs.

"U.S. Appl. No. 17/410,814, 312 Amendment filed Aug. 25, 2023", 3 pgs.

"U.S. Appl. No. 17/410,787, Non Final Office Action mailed Aug. 29, 2023", 14 pgs.

"U.S. Appl. No. 17/445,767, Response filed Sep. 1, 2023 to Non Final Office Action mailed Jun. 1, 2023", 13 pgs.

"U.S. Appl. No. 17/445,767, Final Office Action mailed Sep. 13, 2023", 30 pgs.

"U.S. Appl. No. 17/410,787, Response filed Nov. 1, 2023 to Non Final Office Action mailed Aug. 29, 2023", 10 pgs.

"U.S. Appl. No. 17/410,787, Advisory Action mailed Feb. 9, 2024", 4 pgs.

"U.S. Appl. No. 17/410,787, Final Office Action mailed Dec. 27, 2023", 17 pgs.

"U.S. Appl. No. 17/410,787, Response filed Jan. 31, 2024 to Final Office Action mailed Dec. 27, 2023", 11 pgs.

U.S. Appl. No. 18/471,056, filed Sep. 20, 2023, 3D Painting on an Eyewear Device.

U.S. Appl. No. 18/456,286, filed Aug. 25, 2023, Media Content Player on an Eyewear Device.

U.S. Appl. No. 17/445,767, filed Aug. 24, 2021, Recentering AR/VR Content on an Eyewear Device.

U.S. Appl. No. 17/445,774, filed Aug. 24, 2021, 3d Painting on an Eyewear Device.

U.S. Appl. No. 17/410,787, filed Aug. 24, 2021, Gesture Control on an Eyewear Device.

U.S. Appl. No. 17/410,814, filed Aug. 24, 2021, Media Content Player on an Eyewear Device.

"U.S. Appl. No. 17/410,787, Non Final Office Action mailed May 20, 2024", 23 pgs.

* cited by examiner

CONVERSATION INTERFACE ON AN EYEWEAR DEVICE

CLAIM OF PRIORITY

This application claims the benefit of priority to U.S. Provisional Application Ser. No. 63/129,235, filed Dec. 22, 2020, which is incorporated herein by reference in its entirety.

BACKGROUND

Some electronics-enabled eyewear devices, such as so-called smart glasses, allow users to interact with virtual content while a user is engaged in some activity. Users wear the eyewear devices and can view a real-world environment through the eyewear devices while interacting with virtual content that is displayed by the eyewear devices.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
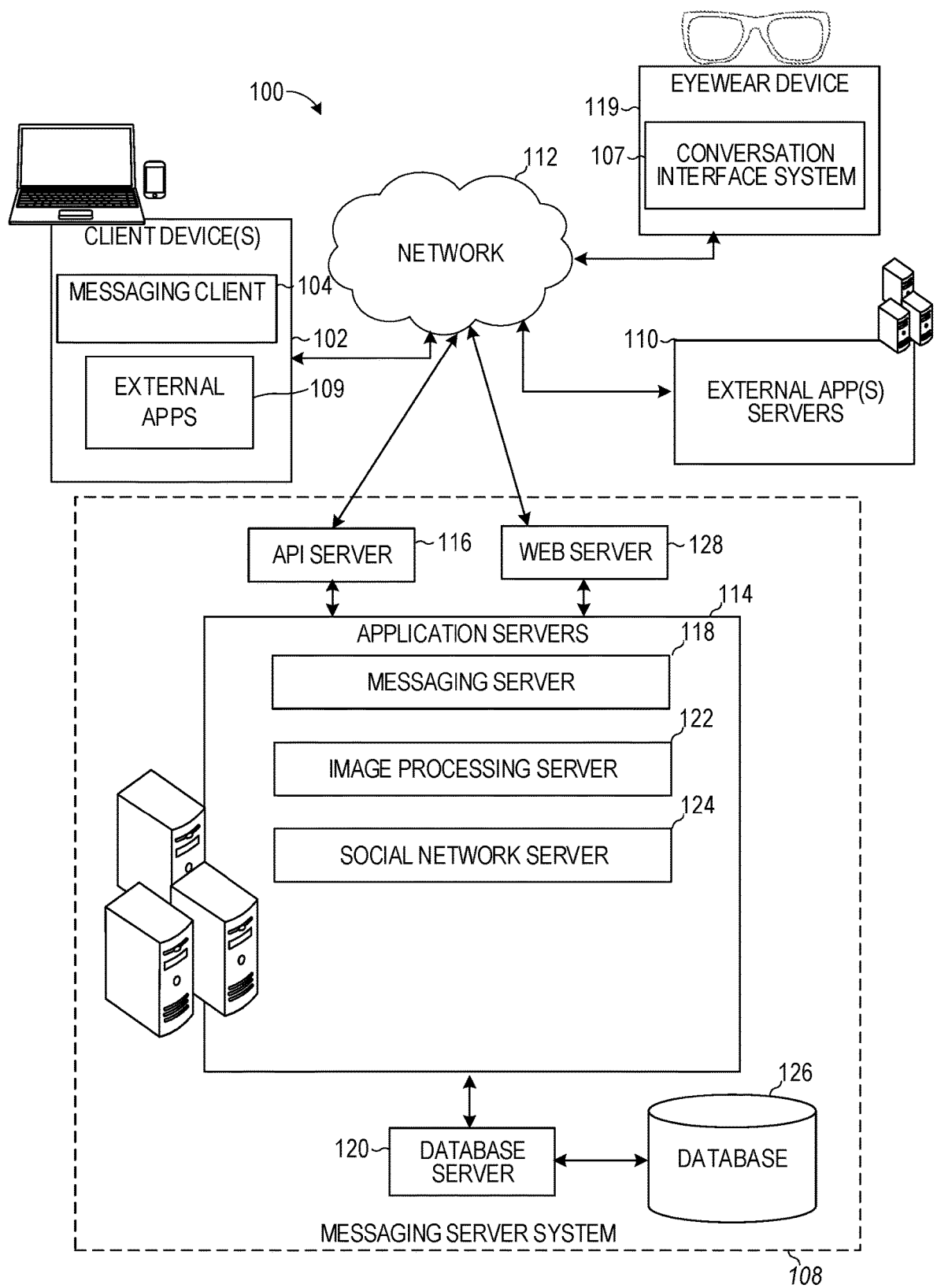
FIG. 1 is a diagrammatic representation of a networked environment in which the present disclosure may be deployed, in accordance with some examples.

The description that follows discusses illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

Typical smart glass platforms allow users to read their text messages within the smart glasses as well as interact with other types of virtual content. Such platforms are configured to display the virtual content in the lenses of the smart glasses. While such systems work well to generally allow users to interact with virtual content, such devices fail to consider movement of the user through the real-world environment in the display of the virtual content. Some systems continuously display the virtual content as the user moves around the real-world environment but doing so does not always make sense and can end up inundating the user with too much information making such presentation counterproductive. Namely, such devices fail to selectively determine whether or not to continue to display virtual content within a current view of the real-world environment as the user moves around which, in turn, ends up frustrating the user and ends up distracting the users from activities they are performing.

In addition, the typical way of presenting the virtual content in the lenses of the smart glasses ends up consuming a great deal of processing and battery resources. This is because such devices use standard, resource-intensive programming languages and operations to process the virtual content and further use additional resources to generate such virtual content for display. As a result, the battery life of these typical smart glasses is very limited, requiring a user to constantly charge the smart glasses for use, which takes away from the appeal and interest of using the smart glasses.

The disclosed embodiments improve the efficiency of using the electronic device by controlling the look and feel of a conversation in an eyewear device and selectively bringing into view relevant portions of the conversation. For example, more recent messages are displayed closer and more prominently to the wearer of the eyewear device than older messages. This reduces the amount of unnecessary information that occupies a display of the eyewear device and blocks view of a real-world environment. Specifically, the disclosed embodiments receive, by an eyewear device, a request to access a conversation interface and, in response, retrieve a plurality of virtual conversation objects associated with the conversation interface. The disclosed embodiments display a first virtual conversation object of the plurality of virtual conversation objects at a first location in three-dimensional space and determine that a second virtual conversation object of the plurality of virtual conversation objects is associated with an earlier timestamp than the first virtual conversation object. In response to determining that the second virtual conversation object is associated with the earlier timestamp than the first virtual conversation object, the disclosed embodiments display the second virtual conversation object at a second location in three-dimensional space that is closer to a user of an eyewear device than the first location. This avoids distracting and disturbing the user from performing an activity while interacting with virtual content.

Because the processor of the eyewear device executes a low-power process to selectively bring into view virtual objects that are displayed within a real-world environment, the battery life of the electronic eyewear device is enhanced. This increases the efficiency, appeal, and utility of electronic eyewear devices.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications 109 using Applications Program Interfaces (APIs). The messaging system 100 includes an eyewear device 119, which hosts a conversation interface system 107, among other applications. The eyewear device 119 is communicatively coupled to the client device 102 via the network 112 (which may include via a dedicated short-range communication path, such as a Bluetooth™ or WiFi direct connection).

The conversation interface system 107 automatically or selectively moves or repositions virtual conversation objects in three-dimensional space based on the object's age, priorities, or combination thereof. For example, the user or wearer of the eyewear device 119 may provide input (e.g., using a client device 102 or a voice activated or touch activated interface of the eyewear device 119) to launch or access a conversation interface that includes a plurality of virtual conversation objects. In response, a list of virtual conversation objects associated with a conversation interface is retrieved and presented within view of a real-world environment. The eyewear device 119 can communicate with the client device 102 to obtain the information associated with the conversation interface or can communicate with a remote server to obtain the information associated with the conversation.

The virtual conversation objects can include chat bubbles that include messages transmitted by respective participants of the conversation. The chat bubbles can also identify conversation participants using avatars, names or other identifiers unique to each participant. The virtual conversation objects can include interactive elements, such as a microphone button or option or a message generation option. The interactive elements allow the user to generate messages for transmission to other participants in the conversation.

In an example, the conversation interface system 107 assigns a first virtual location to a first virtual conversation object and assigns a second virtual location to a second virtual conversation object. The virtual locations can be selected based on the type of virtual conversation object and based on timestamps or priorities of the virtual conversation objects. For example, the conversation interface system 107 can determine that the second virtual conversation object represents a more recently received message in the conversation interface than a message represented by the second virtual conversation object. In one implementation, the conversation interface system 107 can compare timestamps associated with each virtual conversation object to determine which one of the virtual conversation objects includes the most recent content.

The conversation interface system 107 can present the virtual conversation objects in three-dimensional space based on each object's respective virtual location. In one example, the conversation interface system 107 presents virtual objects that are of higher priority or represent the most recently received message in the conversation interface at a virtual location in three-dimensional space that is closest to the user than other virtual locations. For example, a z-axis can be used which represents a distance of the user to real-world and virtual objects that the user can see using the eyewear device 119. The conversation interface system 107 can place each virtual conversation object at a different point along the z-axis based on their respective timestamps and priorities. In some cases, each virtual conversation object is angled along the z-axis so that a top portion of the virtual conversation object appears further away from the user than a bottom portion of the virtual conversation object.

The priorities of the virtual conversation objects can be determined based on content of the messages (e.g., whether a video or image is included in the message or whether the message includes directions to an event). The priorities can also or alternatively be determined based on an identity of the participant who transmitted the message. The priority can also be determined based on whether the user has viewed, read or responded to the message associated with the virtual conversation object. For example, if one conversation object represents a message that was recently received and read by the user and another conversation object represents an older message that has not yet been read, the older virtual conversation object is assigned a higher priority and can be displayed to appear closer to the user than the more recently received message of the other conversation object.

The chat bubbles or virtual conversation objects can be animated in different ways. The chat bubbles can each have a particular animation associated with the user or participant who sent the message of the chat bubble or can all be animated the same way. As an example, the chat bubbles can continuously or periodically be zoomed in and out by a certain level of zoom in a looped manner. As another example, virtual light can be reflected off of the chat bubbles in different ways depending on the angle at which the user of wearer of the eyewear device 119 is looking at the conversation interface. A surface normal to the virtual conversation objects can be used to determine the angle between the virtual conversation objects and a center of the eyewear device 119. Based on the angle that is formed, more or less light can appear to reflect off of each virtual conversation object.

The chat bubbles can indicate a type of device (e.g., eyewear device 119 or client device 102) that is being currently used or that was used by a respective user to send the message represented by the chat bubble. For example, if a first participant was using a mobile phone to send a message that is represented by a first chat bubble to a user of the eyewear device 102, an indicator including a mobile phone icon can be included in the first chat bubble. As another example, if a second participant was using a smart watch to send a message that is represented by a second chat bubble to the user of the eyewear device 102, an indicator including a watch icon can be included in the second chat bubble. If the first participant later transitioned to accessing the conversation interface on an eyewear device, the indicator can be updated or changed from including a mobile phone icon to including an eyewear or glasses icon. These indicators inform the user of the eyewear device 119 of what type of devices different participants in the conversation are currently using to access and view the conversation interface.

In some cases, the user can perform a gesture or provide an instruction (e.g., can press and hold a touch interface of the eyewear device 119) to interact with the conversation interface that is displayed within view of the eyewear device 119. For example, the user can tap on the eyewear device 119 and in response, the conversation interface system 107 determines a given conversation object that is closest to a center of the display provided by the eyewear device 119. As another example, the eyewear device 119 includes a camera that can detect body parts of the user of the eyewear device 119 (e.g., hands of the user). If the hands of the user perform a certain gesture (e.g., pointing) directed to or centered around the given conversation object, the eyewear device 119, in response, selects the given conversation object as a target for which to select a function to perform.

In response to determining that a message generation option (or microphone button) is closest to the center of the display relative to the other virtual conversation objects of the conversation interface, the conversation interface system 107 performs a function to generate a message. As another example, in response to determining that the message generation option (or microphone button) is centered around or is the focus of the hand gesture performed by the user, the conversation interface system 107 performs a function to generate a message. For example, the conversation interface system 107 instructs the user to speak to draft a message and when the user taps the eyewear device 119 or says send, the message is sent to the other participants in the conversation interface. As another example, in response to determining that a chat bubble is closest to the center of the display relative to the other virtual conversation objects of the conversation interface, the conversation interface system 107 performs a function to display a set of options. The set of options can include a private message option which allows the user to send a private message only to the participant associated with or who sent the message represented by the chat bubble. The set of options can also include a public message option that allows the user to send a message to all the participants in the conversation.

The eyewear device 119 can display a cursor to indicate the virtual conversation object or virtual object that will be the subject of performing an action when a gesture is performed by the user. For example, in some cases, multiple types of virtual objects can be displayed together within view of a real-world environment on the eyewear device 119. Specifically, the eyewear device 119 can display virtual conversation objects together with virtual media asset objects. In order to perform a function associated with either the conversation or media asset objects, the eyewear device 119 considers which one of the objects is closest to a center of the eyewear device 119 and/or which one of the objects is being selected by a hand gesture detected by the eyewear device 119. For example, the eyewear device 119 can detect a body part of a user within view of the eyewear device and can detect that the body part performed a given motion (e.g., pointing towards an object) within a threshold distance of a given virtual object. If so, the eyewear device 119 performs a function (e.g., controls playback of the media asset or generates a response or message in a conversation) associated with the type of virtual object that is within the threshold distance of the body part that performed the given motion.

In another example, the eyewear device 119 determines whether the virtual media asset object or the virtual conversation object is closer to the center of the eyewear device 119 when a tap or touch input is detected by the eyewear device 119. The eyewear device 119 performs a first function associated with a given virtual conversation object (e.g., generates a message in the conversation interface) if the given virtual conversation object is closer to a center of a display of the eyewear device than the one or more media asset objects. The eyewear device 119 performs a second function associated with a given media asset object (e.g., plays, pauses, skips, or stops playback of a media asset associated with the media asset object) of the one or more media asset objects if the given media asset object is closer to the center than the given virtual conversation object.

A messaging client 104 is able to communicate and exchange data with other messaging clients 104, the eyewear device 119, and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Image processing server 122 is used to implement scan functionality of the augmentation system 208. Scan functionality includes activating and providing one or more augmented reality experiences on a client device 102 when an image is captured by the client device 102. Specifically, the messaging application 104 on the client device 102 can be used to activate a camera. The camera displays one or more real-time images or a video to a user along with one or more icons or identifiers of one or more augmented reality experiences. The user can select a given one of the identifiers to launch the corresponding augmented reality experience. Launching the augmented reality experience includes obtaining one or more augmented reality items associated with the augmented reality experience and overlaying the augmented reality items on top of the images or video being presented.

Figure 3:
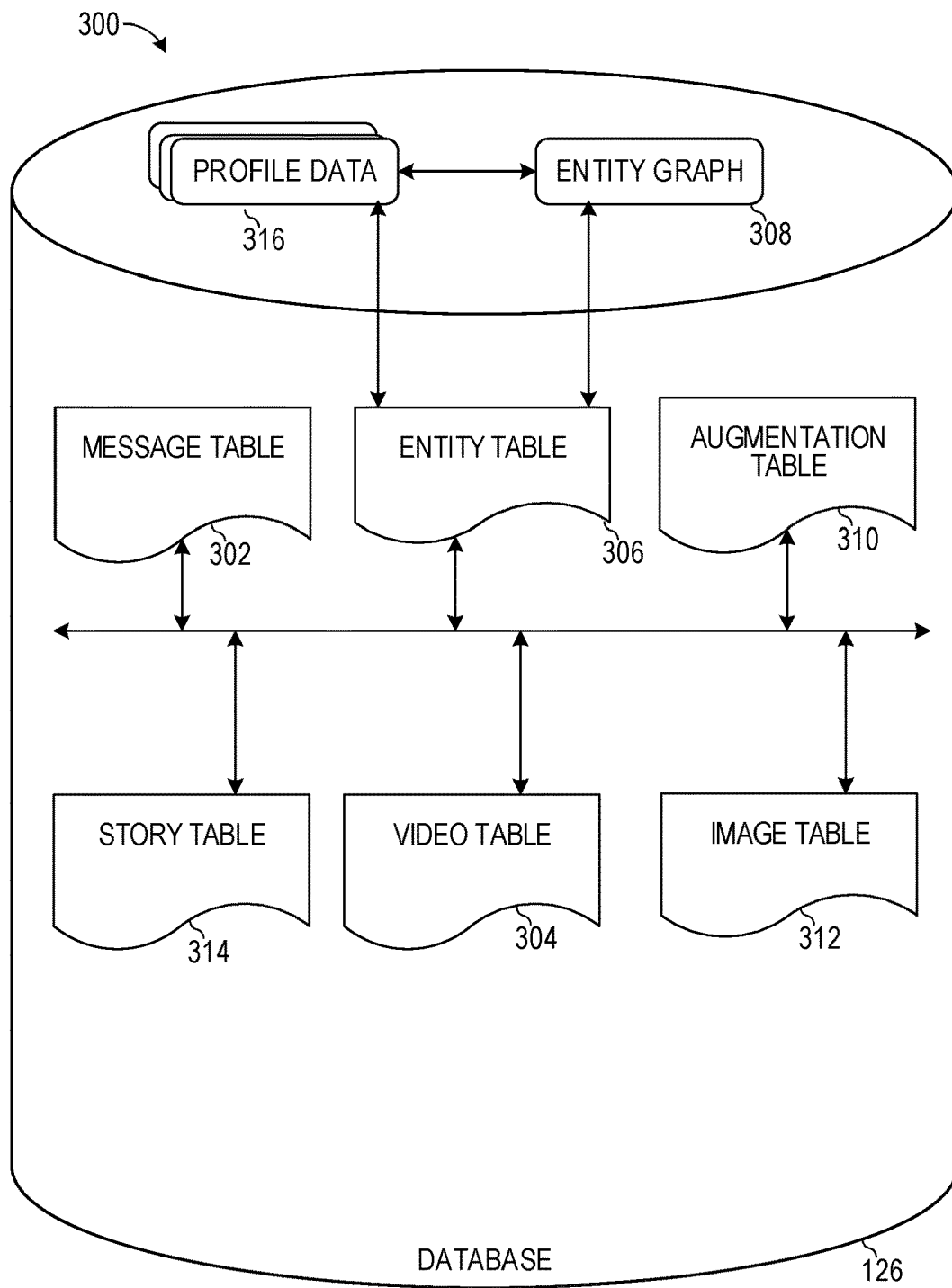
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from a external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

System Architecture

Figure 2:
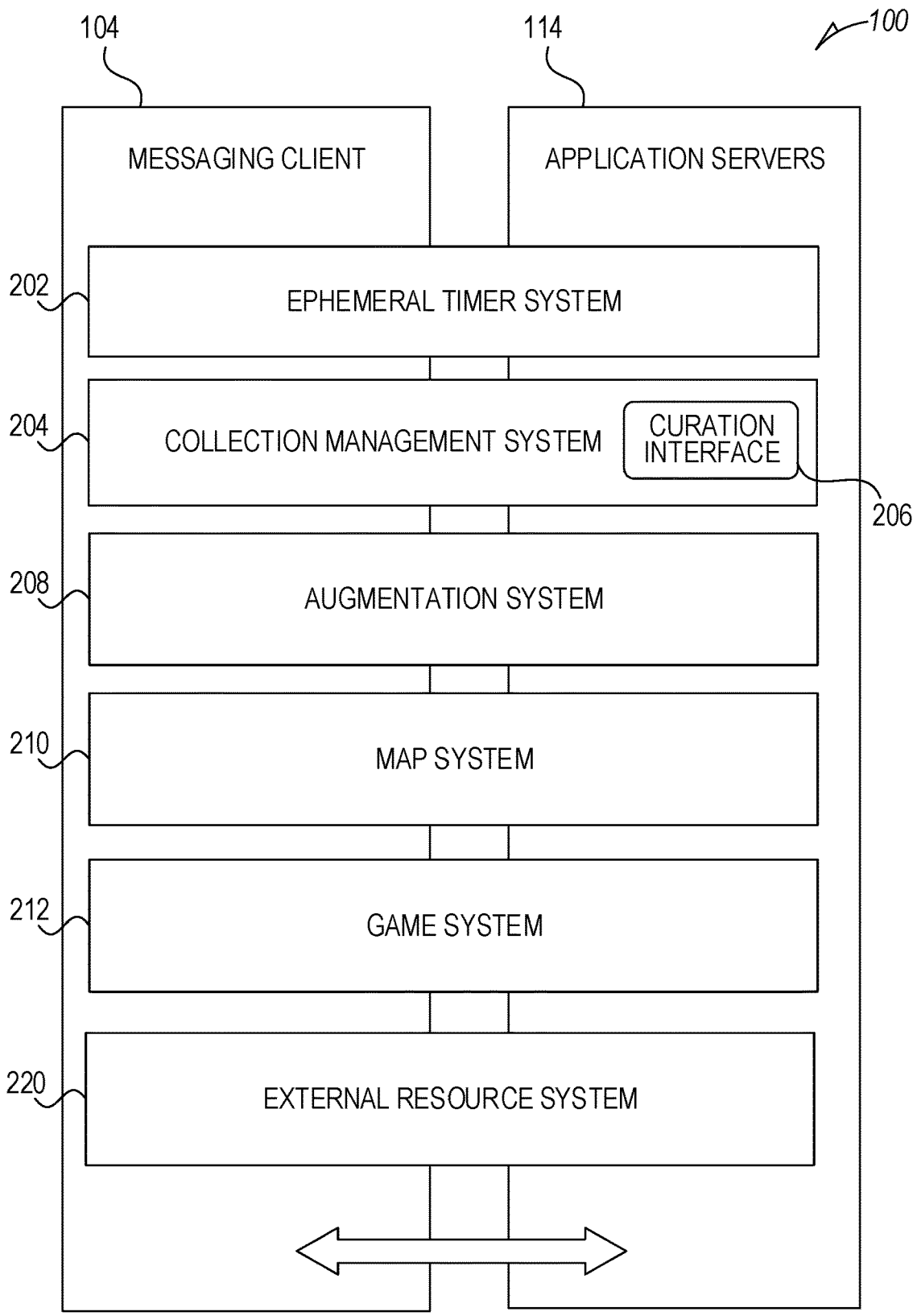
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between a external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
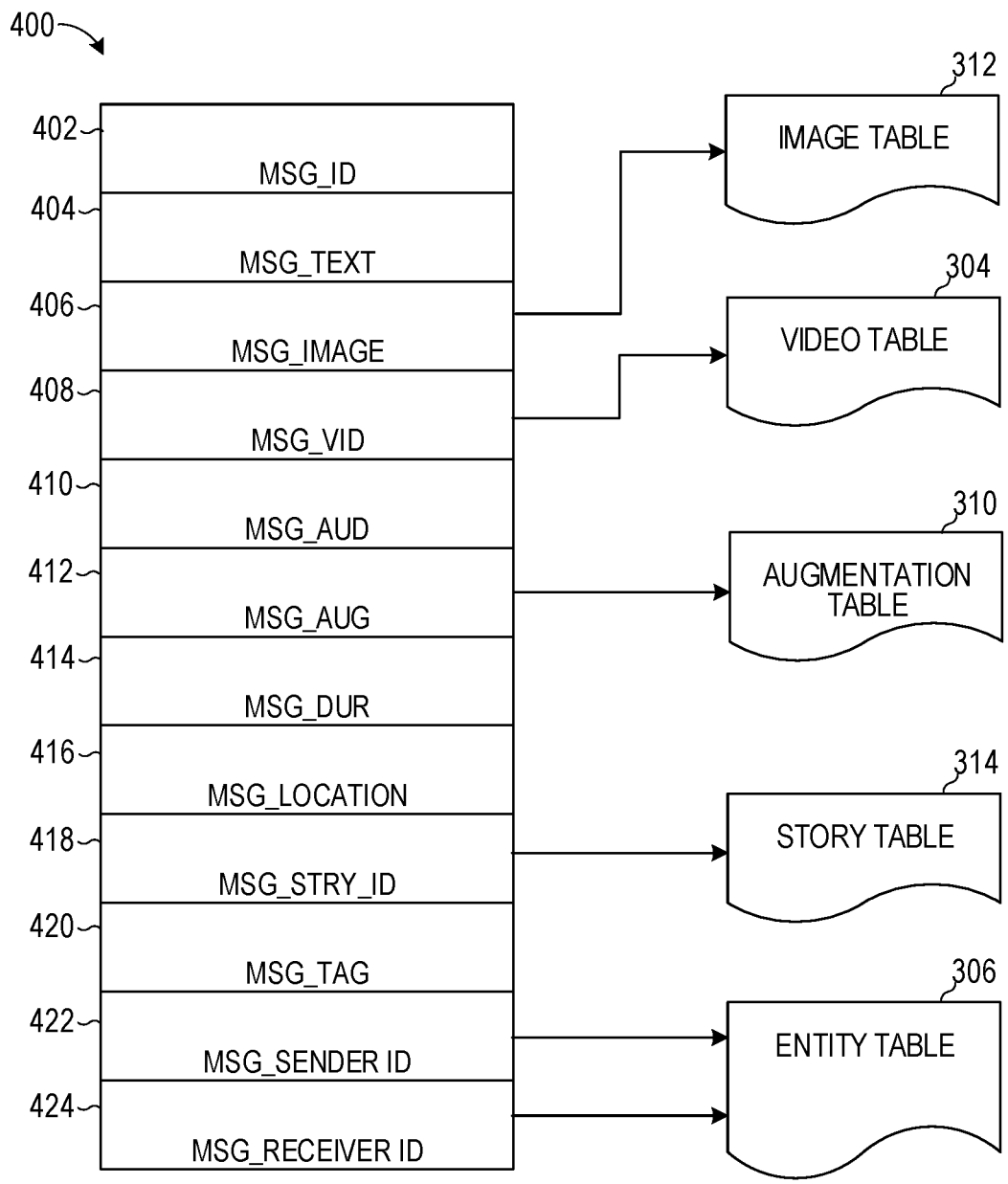
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Eyewear Device

Figure 5:
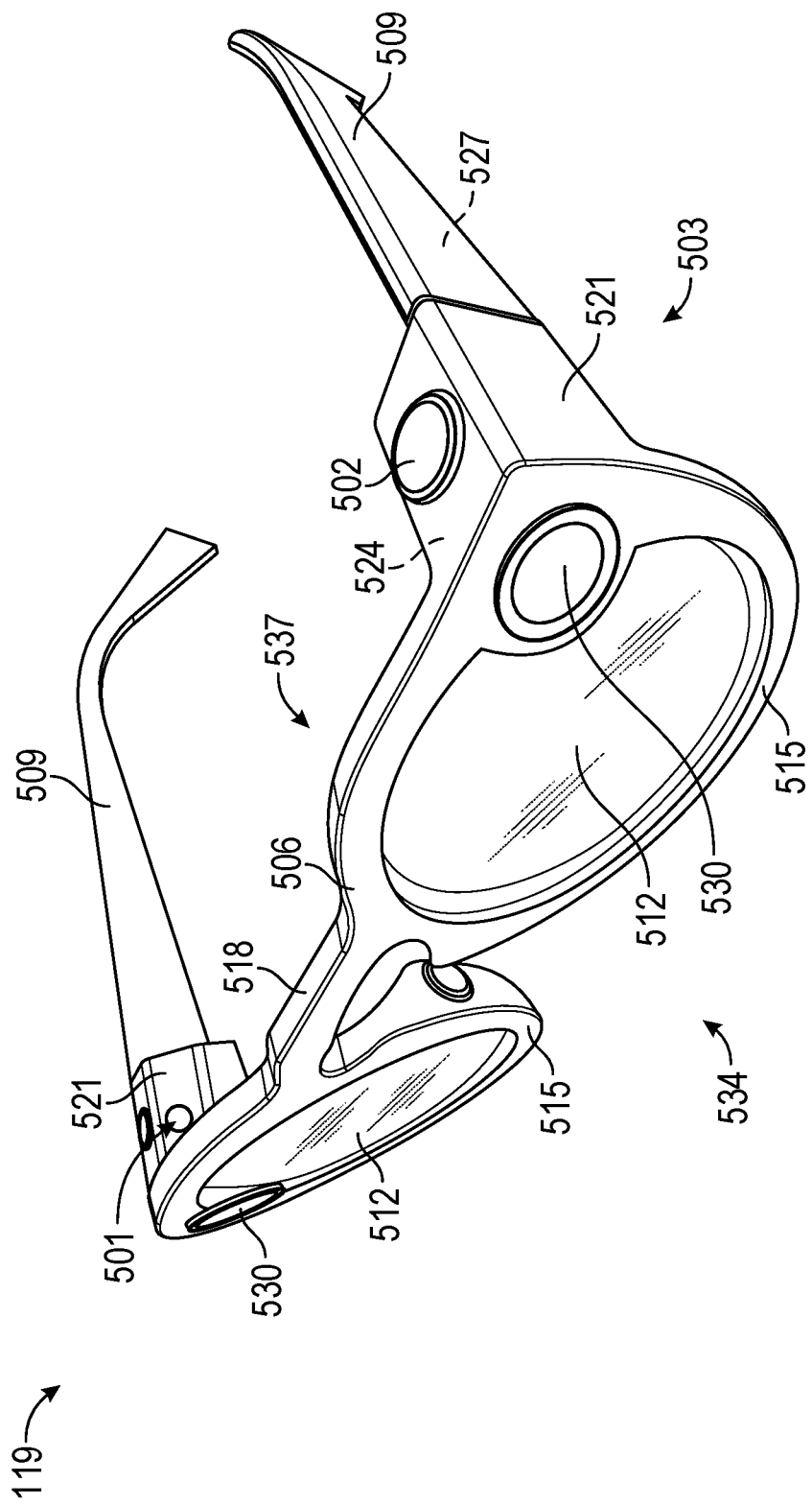
FIG. 5 is a perspective view of an eyewear device according to an example embodiment.

FIG. 5 shows a front perspective view of an eyewear device 119 in the form of a pair of smart glasses that include a conversation interface system 107 according to one example embodiment. The eyewear device 119 includes a body 503 comprising a front piece or frame 506 and a pair of temples 509 connected to the frame 506 for supporting the frame 506 in position on a user's face when the eyewear device 119 is worn. The frame 506 can be made from any suitable material such as plastics or metal, including any suitable shape memory alloy.

The eyewear device 119 includes a pair of optical elements in the form of a pair of lenses 512 held by corresponding optical element holders in the form of a pair of rims 515 forming part of the frame 506. The rims 515 are connected by a bridge 518. In other embodiments, one or both of the optical elements can be a display, a display assembly, or a lens and display combination.

The frame 506 includes a pair of end pieces 521 defining lateral end portions of the frame 506. In this example, a variety of electronics components are housed in one or both of the end pieces 521. The temples 509 are coupled to the respective end pieces 521. In this example, the temples 509 are coupled to the frame 506 by respective hinges so as to be hingedly movable between a wearable mode and a collapsed mode in which the temples 509 are pivoted towards the frame 506 to lie substantially flat against it. In other embodiments, the temples 509 can be coupled to the frame 506 by any suitable means, or can be rigidly or fixedly secured to the frame 506 so as to be integral therewith.

Each of the temples 509 that includes a front portion of that is coupled to the frame 506 and any suitable rear portion for coupling to the ear of the user, such as the curves or cute piece illustrated in the example embodiment of FIG. 5. In some embodiments, the frame 506 is formed of a single piece of material, so as to have a unitary or monolithic construction. In some embodiments, the whole of the body 503 (including both the frame 506 and the temples 509) can be of the unitary or monolithic construction.

The eyewear device 119 has onboard electronics components including a computing device, such as a computer 524, or low power processor, which can in different embodiments be of any suitable type so as to be carried by the body 503. In some embodiments, the computer 524 is at least partially housed in one or both of the temples 509. In the present embodiment, various components of the computer 524 are housed in the lateral end pieces 521 of the frame 506. The computer 524 includes one or more processors with memory (e.g., a volatile storage device, such as random access memory or registers), a storage device (e.g., a non-volatile storage device), wireless communication circuitry (e.g., BLE communication devices and/or WiFi direct devices), and a power source. The computer 524 comprises low-power circuitry, high-speed circuitry, and, in some embodiments, a display processor. Various embodiments may include these elements in different configurations or integrated together in different ways.

The computer 524 additionally includes a battery 527 or other suitable portable power supply. In one embodiment, the battery 527 is disposed in one of the temples 509. In the eyewear device 119 shown in FIG. 5, the battery 527 is shown as being disposed in one of the end pieces 521, being electrically coupled to the remainder of the computer 524 housed in the corresponding end piece 521.

The eyewear device 119 is camera-enabled, in this example comprising a camera 530 mounted in one of the end pieces 521 and facing forwards so as to be aligned more or less with the direction of view of a wearer of the eyewear device 119. The camera 530 is configured to capture digital images (also referred to herein as digital photographs or pictures) as well as digital video content. Operation of the camera 530 is controlled by a camera controller provided by the computer 524, image data representative of images or video captured by the camera 530 being temporarily stored on a memory forming part of the computer 524. In some embodiments, the eyewear device 119 can have a pair of cameras 530, e.g. housed by the respective end pieces 521.

The onboard computer 524 and the lenses 512 are configured together to provide a conversation interface system 107 that automatically and selectively presents and formats a conversation interface within view of the lenses 512 by displaying different virtual conversation objects at different virtual locations based on priority or timestamps of the messages their represent. Specifically, the lenses 512 can display virtual content (e.g., virtual conversation objects, virtual media asset or other type of virtual objects) of the same or different types together or separately. This makes it appear to the user that the virtual content is integrated within a real-world environment that the user views through the lenses 512. In some embodiments, the virtual content is received from the client device 102. In some embodiments, the virtual content is received directly from the application servers 114.

The eyewear device 119 includes an accelerometer and a touch interface and a voice command system. Based on input received by the eyewear device 119 from the accelerometer and a touch interface and the voice command system, the eyewear device 119 can control user interaction with the virtual content. In one example, the user interaction can control playback of content that is presented on the lenses 512. In another example, the user interaction can navigate through a playlist or music or video library. In another example, the user interaction can navigate through a conversation the user is involved in, such as by scrolling through various chat bubbles and selecting individual chat bubbles to respond to generate messages to transmit to participants of the conversation.

The eyewear device 119 further includes one or more communication devices, such as Bluetooth low energy (BLE) communication interface. Such BLE communication interface enables the eyewear device 119 to communicate wirelessly with the client device 102. Other forms of wireless communication can also be employed instead of, or in addition to, the BLE communication interface, such as a WiFi direct interface. The BLE communication interface implements a standard number of BLE communication protocols.

A first of the communications protocols implemented by the BLE interface of the eyewear device 119 enables an unencrypted link to be established between the eyewear device 119 and the client device 102. In this first protocol, the link-layer communication (the physical interface or medium) between the eyewear device 119 and the client device 102 includes unencrypted data. In this first protocol, the application layer (the communication layer operating on the physically exchanged data) encrypts and decrypts data that is physically exchanged in unencrypted form over the link layer of the BLE communication interface. In this way, data exchanged over the physical layer can freely be read by an eavesdropping device, but the eavesdropping device will not be able to decipher the data that is exchanged without performing a decryption operation in the application layer.

A second of the communications protocols implemented by the BLE interface of the eyewear device 119 enables an encrypted link to be established between the eyewear device 119 and the client device 102. In this second protocol, the link-layer communication (the physical interface) between the eyewear device 119 and the client device 102 receives data from the application layer and adds a first type of encryption to the data before exchanging the data over the physical medium. In this second protocol, the application layer (the communication layer operating on the physically exchanged data) may or may not use a second type of encryption to encrypt and decrypt data that is physically exchanged in encrypted form, using the first type of encryption, over the link layer of the BLE communication interface. Namely, data can be first encrypted by the application layer and then be further encrypted by the physical layer before being exchanged over the physical medium. Following the exchange over the physical medium, the data is then decrypted by the physical layer and then decrypted again (e.g., using a different type of encryption) by the application layer. In this way, data exchanged over the physical layer cannot be read by an eavesdropping device as the data is encrypted in the physical medium.

In some embodiments, the client device 102 communicates with the eyewear device 119 using the first protocol to exchange images or videos or virtual content between the messaging client 104 and the eyewear device 119.

Conversation Interface System

Figure 6:
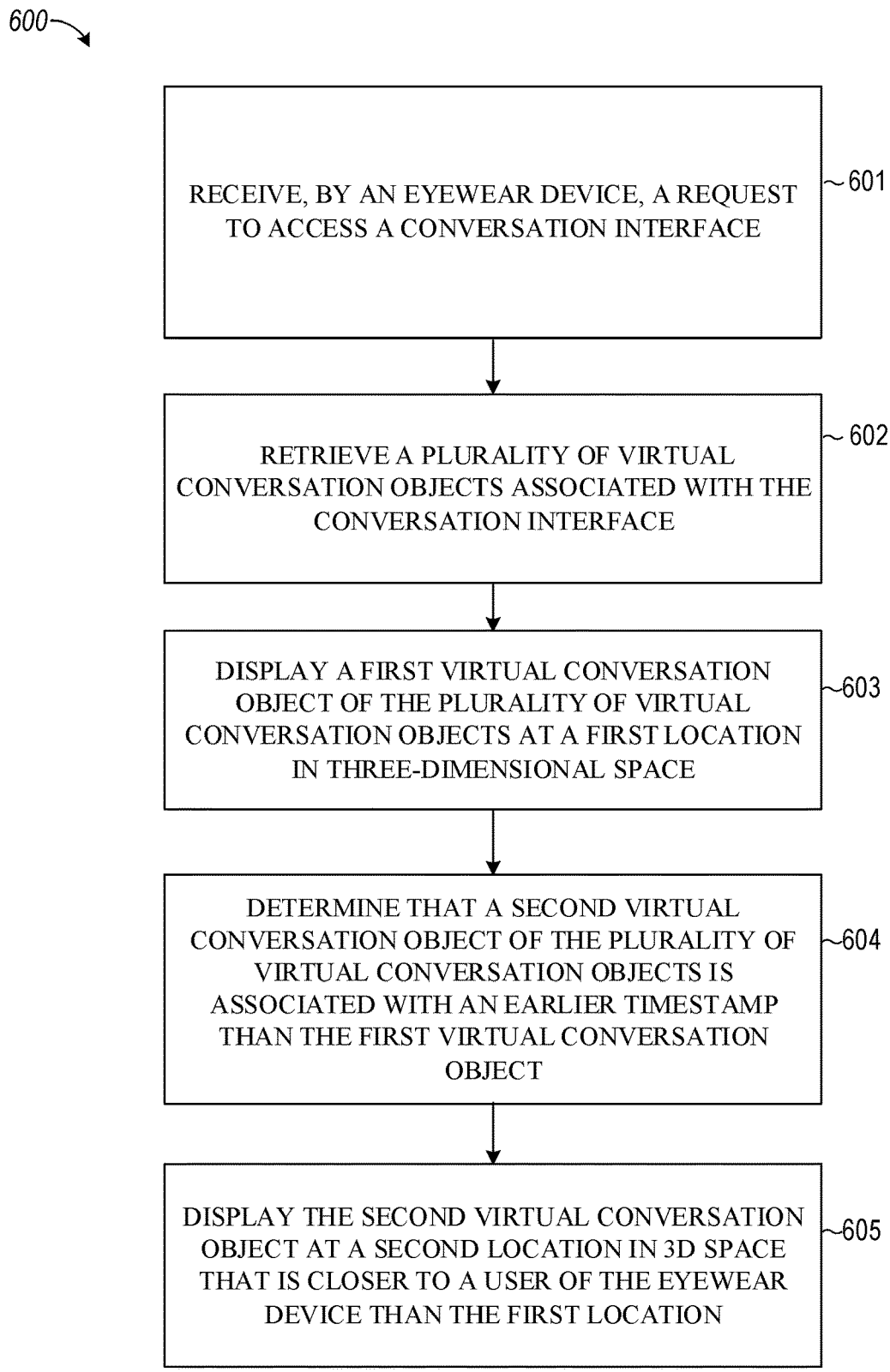
FIG. 6 is a flowchart showing example operations of the conversation interface system according to an example embodiment.

FIG. 6 is a flowchart illustrating example operations of the conversation interface system 107 in performing a process 600, according to example embodiments. The process 600 may be embodied in computer-readable instructions for execution by one or more processors such that the operations of the process 600 may be performed in part or in whole by the functional components of the notification management system 107; accordingly, the process 600 is described below by way of example with reference thereto. However, in other embodiments, at least some of the operations of the process 600 may be deployed on various other hardware configurations. The process 600 is therefore not intended to be limited to the conversation interface system 107 and can be implemented in whole, or in part, by any other component. Some or all of the operations of process 600 can be in parallel, out of order, or entirely omitted.

At operation 601, the conversation interface system 107 receives a request to access a conversation interface. For example, the user can perform a gesture with the user's hands, speak a command, select an on-screen option to launch a conversation interface, select an option on a mobile phone or client device 102 to launch a conversation interface on the eyewear device 119, or any combination thereof.

At operation 602, the conversation interface system 107 in response to receiving the request, retrieves a plurality of virtual conversation objects associated with the conversation interface. For example, the eyewear device 119 obtains one or more chat bubbles (or messages for inclusion in chat bubbles) representing different messages received as part of the conversation interface.

At operation 603, the conversation interface system 107 displays a first virtual conversation object of the plurality of virtual conversation objects at a first location in three-dimensional space. For example, the eyewear device 119 displays the first virtual conversation object at a first distance from the user of the eyewear device 119.

At operation 604, the conversation interface system 107 determines that a second virtual conversation object of the plurality of virtual conversation objects is associated with an earlier timestamp than the first virtual conversation object. For example, the eyewear device 119 determines that a message included in the second virtual conversation object was received after a message included in the first virtual conversation object.

At operation 605, the conversation interface system 107 in response to determining that the second virtual conversation object is associated with the earlier timestamp than the first virtual conversation object, displays the second virtual conversation object at a second location in three-dimensional space that is closer to a user of the eyewear device than the first location. In another example, the conversation interface system 107 in can determine priorities of the virtual conversation objects and can selectively display the virtual conversation objects at different virtual locations based on their respective priorities. In some cases, the conversation interface system 107 displays the virtual conversation objects at different virtual locations based on timestamps of messages the virtual conversation objects represent and based on respective priorities.

Figure 7:
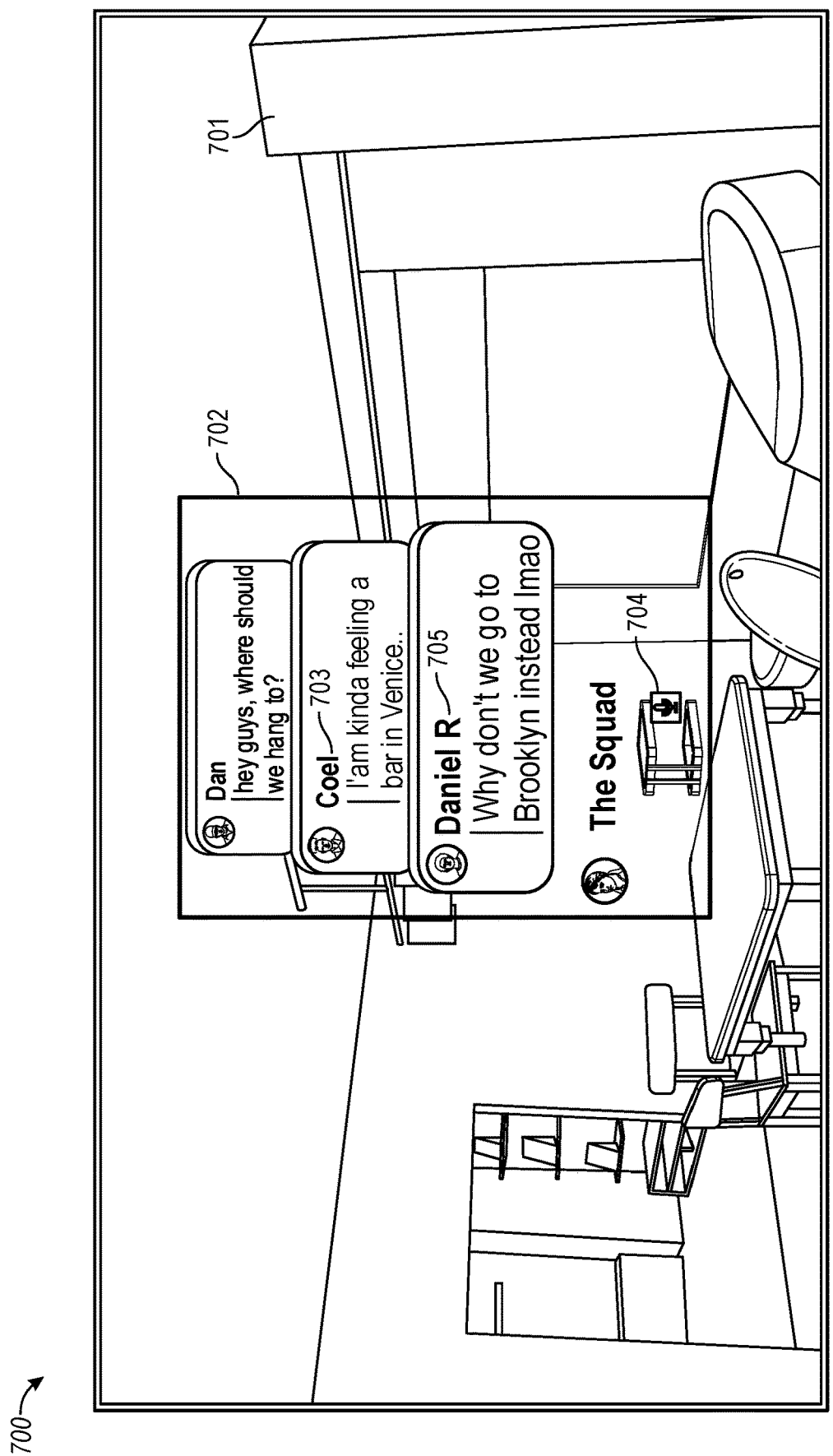
FIGS. 7-9 are illustrative screens of a graphical user interface for the conversation interface system according to example embodiments.
Figure 8:
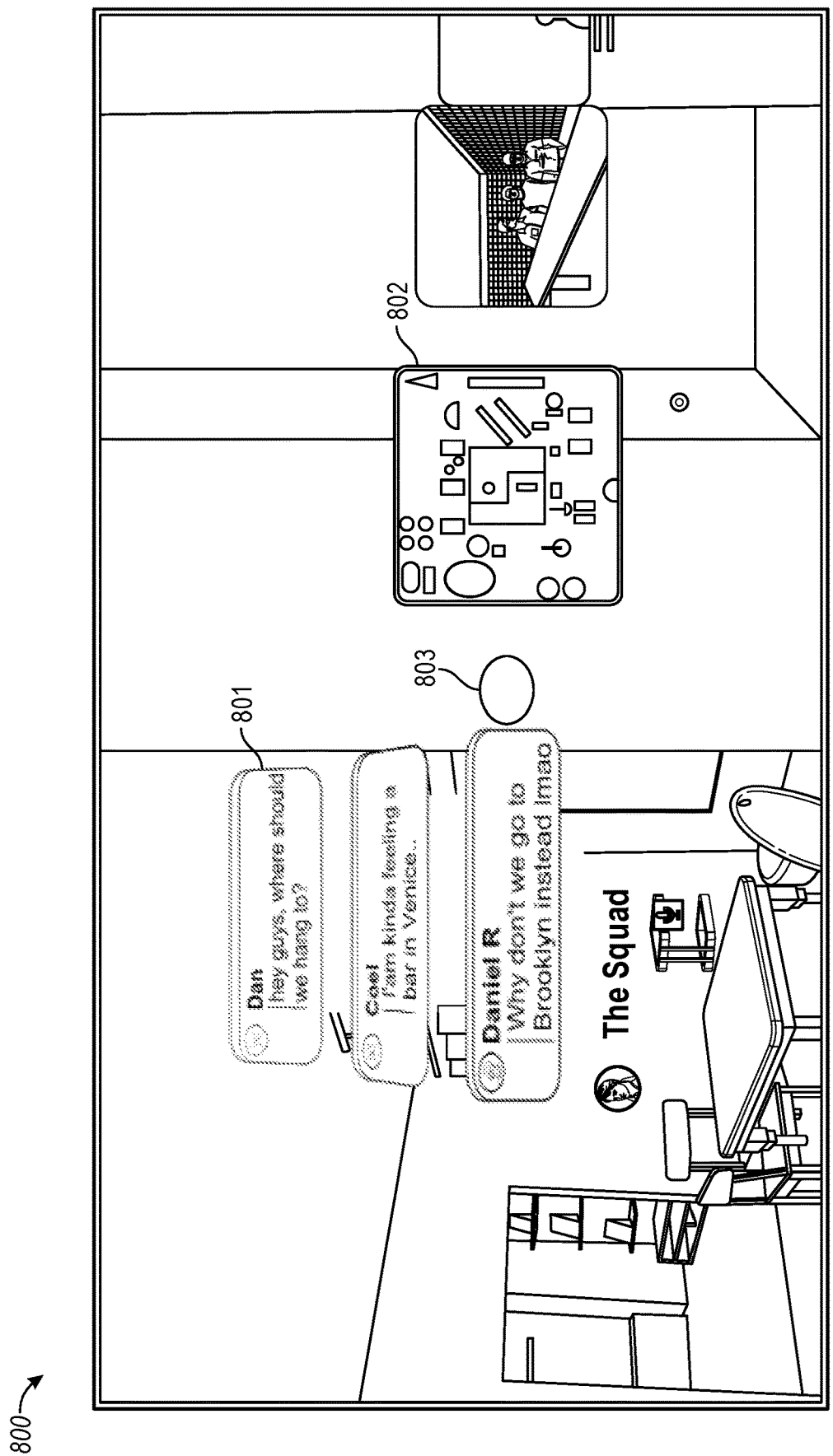
Figure 9:
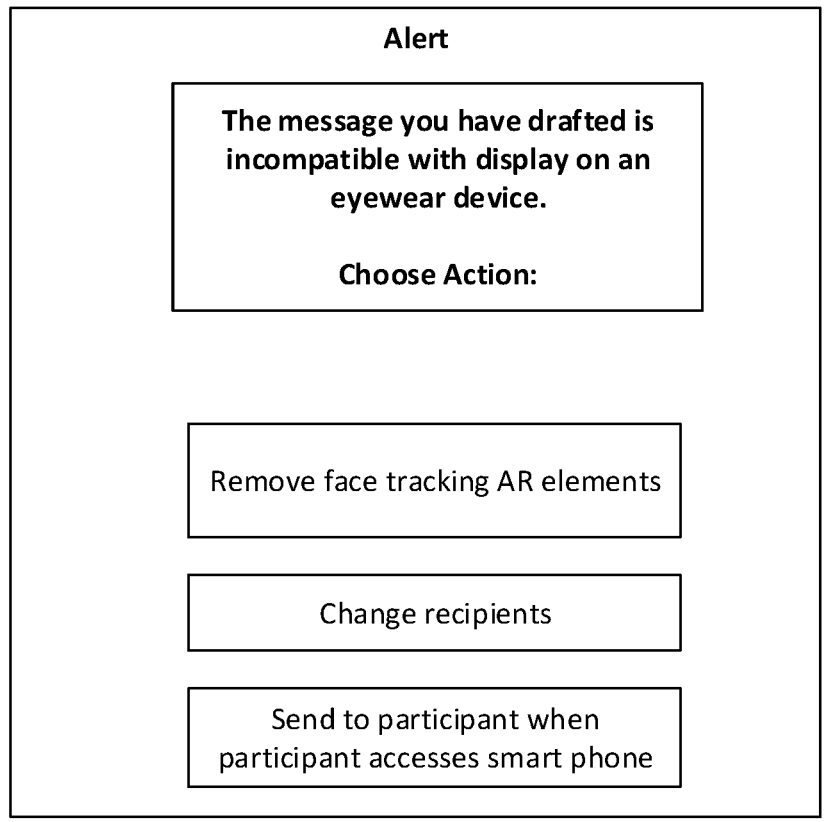

FIGS. 7-9 are illustrative screens of a graphical user interface of the conversation interface system 107 according to example embodiments. The screens shown in FIGS. 7-9 may be provided by the messaging client 104 of one or more client devices 102, other applications implemented on one or more client devices 102, or the eyewear device 119.

For example, the screen 700 shows a view of a first portion of a real-world environment 701 through the lenses 512 of the eyewear device 119. The eyewear device 119 may receive input from the user that requests to view a conversation interface. In response, the eyewear device 119 obtains from the client device 102 and/or from the application servers 114 a conversation interface 702 that includes one or more virtual conversation objects. The virtual conversation objects include chat bubbles 703 and 705? representing individual messages sent by respective participants in the conversation and a message generation option 704 (e.g., a microphone) allowing the user to generate a new message for transmission to the participants in the conversation interface. The eyewear device 119 displays the virtual objects 702 as three-dimensional objects in a center of the lenses 512. This makes it appear to the user viewing the first portion of the real-world environment 701 through the lenses 512 as if the virtual objects 702 are within the first portion of the real-world environment 701.

The eyewear device 119 can retrieve timestamps and/or priority information for each of the chat bubbles displayed in the conversation interface 702. Based on the timestamps or priority information, the eyewear device 119 positions the chat bubbles at different three-dimensional locations relative to the user of the eyewear device 119. For example, the chat bubble 705 can be associated with a message having an earlier timestamp than the message represented by the chat bubble 703. In response, the eyewear device 119 can present the chat bubble 705 at a location in three-dimensional space that appears closer to the user of the eyewear device 119 than the chat bubble 703. As another example, the chat bubble 705 can be associated with a message having content that is of higher priority than the message represented by the chat bubble 703. In response, the eyewear device 119 can present the chat bubble 705 at a location in three-dimensional space that appears closer to the user of the eyewear device 119 than the chat bubble 703. The chat bubbles can include an indicator (not shown) that represents the device type the participant of the conversation who generated the message was using or is currently using.

In one example, the eyewear device 112 angles the conversation interface 702 towards the real-world environment and away from the user. For example, the eyewear device 119 angle the chat bubble 703 along the z-axis so that a top portion of the chat bubble 703 appears further away from the user than a bottom portion of the chat bubble 703. In some cases, all of the chat bubbles 703 and 705 are at a same angle. In some cases, the angle of each chat bubble can differ based on various factors (e.g., age or priority or participant of the conversation). For example, chat bubbles that include higher priority content can be angled less towards the screen and more towards the user so they appear more flat to the user than chat bubbles with lower priority content.

As shown in FIG. 8, the eyewear device 119 can display multiple types of virtual objects at the same time. For example, the eyewear device 112 can display a conversation interface 801 and virtual media asset objects 802. The eyewear device 119 can selectively perform a function pertaining to the conversation interface 801 or virtual media asset objects 802 based a distance between a center of the conversation interface 801 and virtual media asset objects 802 and the center 803 of the eyewear device 119. The distance between the centers of the conversation interface 801 and virtual media asset objects 802 and the center 803 of the eyewear device 119 can change as the user physically moves around and looks at different portion of the real-world environment. This is because the conversation interface 801 and virtual media asset objects 802 can remain statically positioned as the user physically moves around to look at different portions of the real-world environment.

In some embodiments, the eyewear device 119 performs a first function associated with the communication interface 801 (e.g., generates a message in the conversation interface) if a distance between a center of the communication interface 801 and the center 803 of the eyewear device 119 is smaller than a distance between a center of the virtual media asset objects 802 and the center 803 of the eyewear device 119. In such cases, the eyewear device 119 determines that the virtual conversation object is closer to a center of a display of the eyewear device 119 than the virtual media asset objects. In response, the eyewear device 119 performs a communication interface function (e.g., allows the user to generate a message, allows the user to read a message or open attachments in the message, and so forth) in response to receiving a given type of gesture (e.g., in response to detecting the user tapped on the eyewear device 119). The eyewear device 119 performs a second function associated with a given media asset object (e.g., plays, pauses, skips, or stops playback of a media asset associated with the media asset object) if the eyewear device 119 determines that the given media asset object is closer to the center than the given virtual conversation object in response to receiving the given type of gesture (e.g., in response to detecting the user tapped on the eyewear device 119).

In some embodiments, a participant in the conversation interface can generate a message using a client device 102 (e.g., using a device that is not an eyewear device 119, such as a smart phone or smart watch). The participant can generate a message that includes certain content or interactive elements that are not compatible with access or view on an eyewear device 119. The messaging client 104 can determine that the one of the participants in the conversation is currently viewing the conversation interface on an eyewear device 119. In response, the messaging client 104 can inform, alert or prompt the participant with a communication indicating that the message generated by the participant is incompatible with being viewed or accessed on the eyewear device 119 and that another participant of the conversation interface is currently using an eyewear device 119.

FIG. 9 shows an illustrative alert 900 that is provided to a participant in the conversation interface. The alert indicating that the message generated by the participant is incompatible with being viewed or accessed on the eyewear device 119 and that another participant of the conversation interface is currently using an eyewear device 119. The alert includes various options that allow the participant to revise the message to make the message compatible with display and presentation on the eyewear device 119. For example, the messaging client 104 can determine that message includes an augmented reality experience that is driven by, responsive to or triggered based on facial tracking. The eyewear device 119 may not include facial tracking components and so such a message will not function properly when accessed on the eyewear device 119. In such cases, the participant is provided with an option to automatically remove the face tracking augmented reality elements from the message. The removal of the face tracking elements can convert the augmented reality elements to static or animated two-dimensional images when displayed to the user of the eyewear device 119.

The alert 900 can include an option to change recipients. In response to receiving a selection from the participant of this option, the messaging client 104 can remove recipients who are viewing the conversation interface on an eyewear device 119 from the list of recipients to which the message is directed. For example, the messaging client 104 can access real-time information associated with each recipient of the message generated by the participant. The messaging client 104 can determine the types of devices used by the recipients and if any of the recipients is using an eyewear device 119, the messaging client 104 removes that participant from the list of recipients of the message.

The alert 900 can include an option to delay delivery of the message to the recipient who is currently accessing the conversation interface on the eyewear device 119. In response to receiving a selection of this option, the messaging client 104 can deliver the message to all the recipients who are not using an eyewear device 119 currently and can save the message for those recipients who are currently using the eyewear device 119. The messaging client 104 can monitor the recipients for which the message was saved and the types of devices they are using. In response to determining that a given one of the recipients has accessed the messaging client 104 on a client device 102 (e.g., a smart phone or a device that is not the eyewear device 119), the messaging client 104 then sends the message to the recipient. In some cases, the messaging client 104 displays a placeholder or indicator to the recipient who is using the eyewear device 119 when the messaging client 104 saves the message for the recipient. The placeholder or indicator can inform the recipient that a message (which is incompatible with the eyewear device 119) has been received and saved for the user. The user can select or activate the indicator which instructs the messaging client 104 to display the corresponding message on the client device 102 of the user. The user can then decide to access the conversation interface on a smart phone and view the corresponding message.

Machine Architecture

Figure 10:
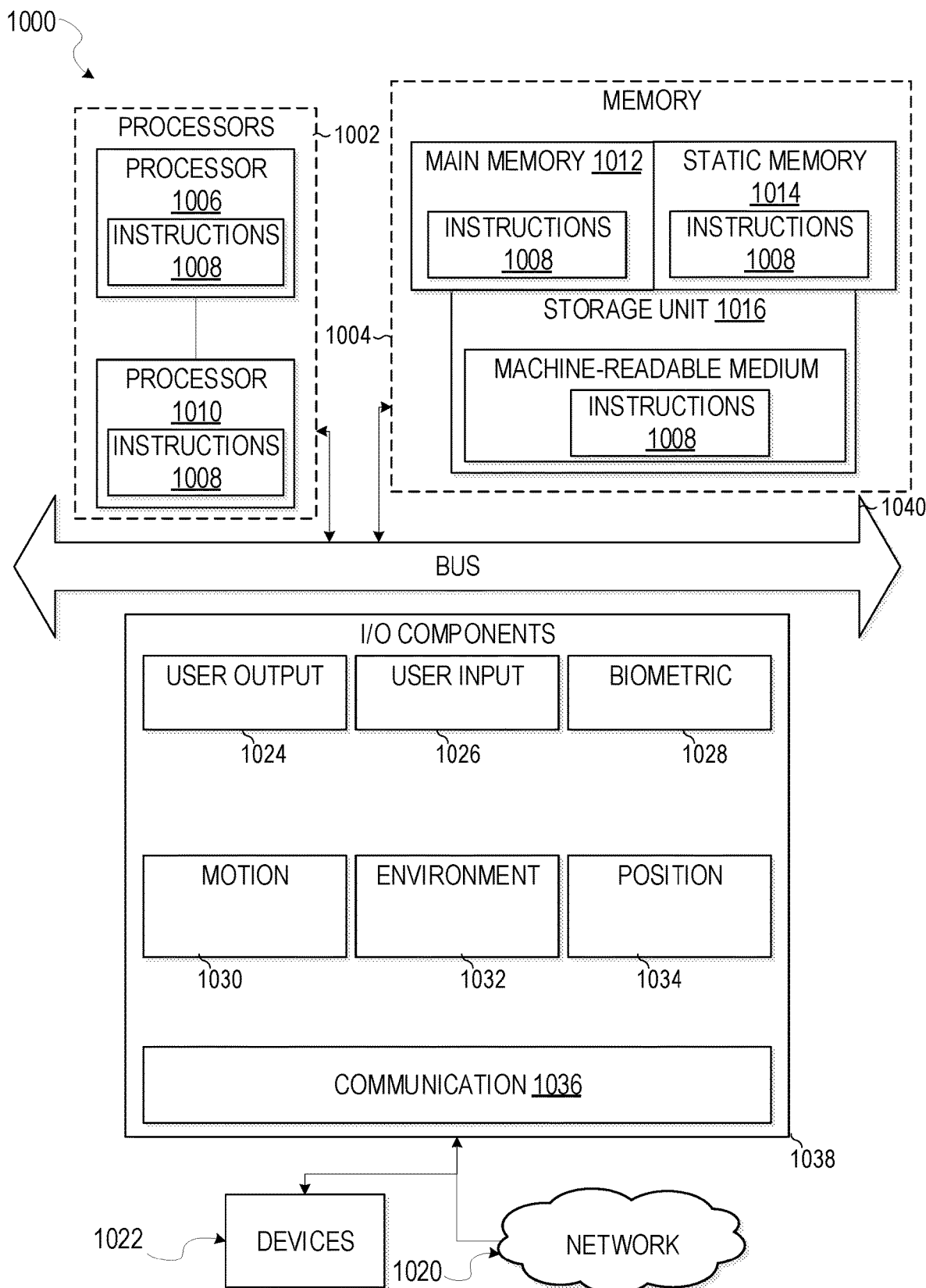
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1004, the static memory 1014, and the storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., hypertext transfer protocol (HTTP)). Similarly, the instructions 1008 may be transmitted or received using a transmission medium via a coupling (e.g., a peer-to-peer coupling) to the devices 1022.

Software Architecture

Figure 11:
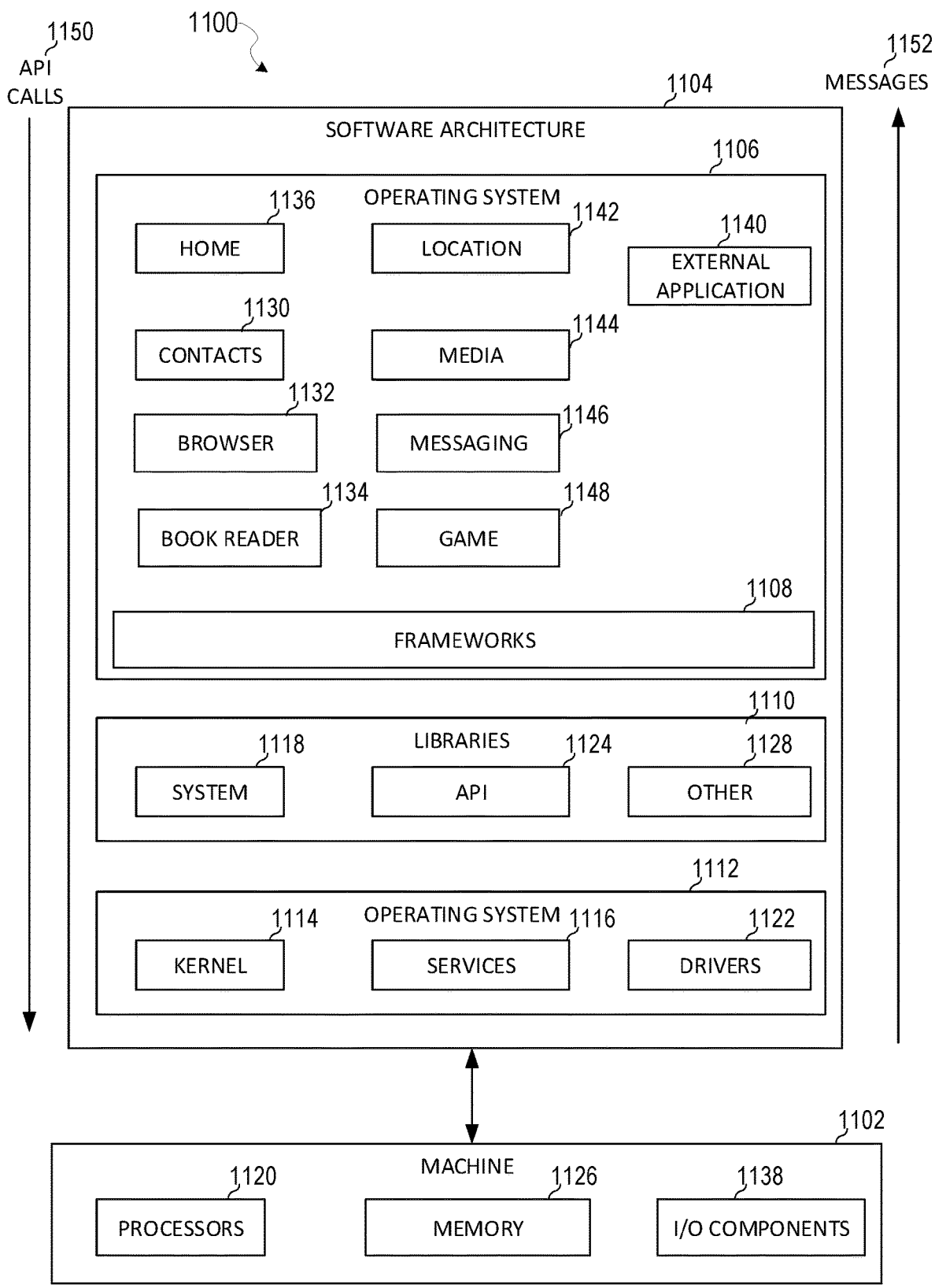
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as a external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the external application 1140 can invoke the API calls 1150 provided by the operating system 1112 to facilitate functionality described herein.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

Modules, Components, and Logic

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner.

In various example embodiments, one or more computer systems (e.g., a standalone computer system, a client computer system, or a server computer system) or one or more hardware modules of a computer system (e.g., a processor or group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application-Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

What is claimed is:

1. A method comprising:
    receiving, by one or more processors of an eyewear device, a request to access a conversation interface of a first conversation comprising messages exchanged between a plurality of participants of the first conversation;
    in response to receiving the request, retrieving, by the one or more processors of the eyewear device, a plurality of virtual conversation objects associated with the conversation interface;
    displaying a first virtual conversation object of the plurality of virtual conversation objects at a first location in three-dimensional space, the first virtual conversation object comprising a first message of the first conversation;
    determining that a second virtual conversation object of the plurality of virtual conversation objects is associated with an earlier timestamp than the first virtual conversation object, the second virtual conversation object comprising a second message of the first conversation;
    in response to determining that the second virtual conversation object is associated with the earlier timestamp than the first virtual conversation object, displaying the second virtual conversation object at a second location in three-dimensional (3D) space that is closer to a user of the eyewear device than the first location without overlapping any portion of the first virtual conversation object including the first message of the first conversation, wherein the second virtual conversation object including the second message of the first conversation, is entirely visible and appears at the second location closer to the user simultaneously with the first virtual conversation object including the first message remaining entirely visible and appearing at the first location such that entire contents of the first and second messages and the first and second virtual conversation objects are visible to the user at different 3D locations;

determining that a message generated by a first participant of the plurality of participants of the first conversation is incompatible with being accessed on the eyewear device;

in response to determining that the message generated by the first participant of the first conversation is incompatible with being accessed on the eyewear device, triggering an alert for presentation to the first participant indicating that the message is incompatible with being accessed by the eyewear device and that a second participant of the plurality of participants is currently using the eyewear device; and prior to sending the message generated by the first participant to the second participant of the plurality of participants, causing the alert to indicate to the first participant that the second participant is currently using the eyewear device, the alert being presented to the first participant in response to determining that the message includes one or more augmented reality elements that are to be generated based on object tracking performed by a target device of the second participant.

2. The method of claim 1 further comprising:
determining that the message, generated by the first participant, is associated with activation of a camera on the target device on which the message is presented to perform object tracking to determine that the message is incompatible with being accessed on the eyewear device.

3. The method of claim 1, further comprising:
angling the plurality of virtual conversation objects along a z-axis which represents a distance towards or away from the user, wherein a top portion of the first virtual conversation object is displayed at a 3D position that is further away from the user than a 3D position of a bottom portion of the first virtual conversation object, wherein angling the plurality of virtual conversation objects comprises:
  determining a first angle for the first virtual conversation object based on an angle of the first conversation associated with the first virtual conversation object; and
  determining a second angle for the second virtual conversation object based on a priority value of the first conversation associated with the second virtual conversation object, the first and second virtual conversation objects being presented at different angles comprising the first and second angles, wherein more or less light appears to be reflected off of each of the first and second virtual conversation objects based on the first and second angles respectively.

4. The method of claim 1, further comprising:
identifying, by the one or more processors, a given virtual conversation object of the plurality of virtual conversation objects that is within a threshold distance of a center of a display of the eyewear device; and
performing, by the one or more processors, a function associated with the given virtual conversation object that is within the threshold distance of the center of the display in response to detecting a gesture from the user.

5. The method of claim 1, wherein the request comprises a gesture performed by the user, further comprising determining a priority value for the first virtual conversation object based on whether directions to an event are included in the messages of the first conversation associated with the first virtual conversation object.

6. The method of claim 1, further comprising:
determining a priority value for the first virtual conversation object based on whether a video is included in the messages of the first conversation associated with the first virtual conversation object.

7. The method of claim 1, wherein the receiving the request comprises:
detecting, by the one or more processors, a body part of a user within view of the eyewear device;
detecting, by the one or more processors, that the body part has performed a given motion; and
determining, by the one or more processors, that the given motion performed by the body part corresponds to a predetermined motion associated with the request to access the conversation interface.

8. The method of claim 1, further comprising:
detecting, by the one or more processors, a body part of a user within view of the eyewear device;
detecting, by the one or more processors, that the body part has performed a given motion within a threshold distance of a given virtual conversation object; and
performing, by the one or more processors, a function associated with the given virtual conversation object that is within the threshold distance of the given motion that was performed.

9. The method of claim 1, further comprising:
displaying one or more media asset objects together with the plurality of virtual conversation objects.

10. The method of claim 9, further comprising:
in response to detecting a gesture from the user:
performing, by the one or more processors, a first function associated with a given virtual conversation object in response to determining that the given virtual conversation object is closer to a center of a display of the eyewear device than the one or more media asset objects; and
performing, by the one or more processors, a second function associated with a given media asset object of the one or more media asset objects in response to determining that the given media asset object is closer to the center than the given virtual conversation object.

11. The method of claim 1, wherein the plurality of participants comprise a third participant, wherein the plurality of virtual conversation objects comprise chat bubbles, a first chat bubble of the chat bubbles being associated with the second participant comprising a first indicator of a first device type being used by the second participant, a second chat bubble of the chat bubbles being associated with the third participant comprising a second indicator of a second device type being used by the third participant, the second indicator being updated to be the first indicator in response to determining that the third participant changes to using the first device type instead of the second device type.

12. The method of claim 1, further comprising:
causing a plurality of options to be displayed in the alert, the plurality of options allowing the first participant to revise the message to make the message compatible with access on the eyewear device of the second participant; and
animating the plurality of virtual conversation objects in different manners, wherein the first virtual conversation object is animated as periodically being zoomed in and out by a certain level of zoom in a looped manner.

13. The method of claim 12, wherein an individual option of the plurality of options included in the alert comprises an option to automatically remove face tracking augmented reality elements from the message, wherein selection of the individual option causes conversion of the face tracking augmented reality elements into static or animated two-dimensional images.

14. The method of claim 12, wherein an individual option of the plurality of options includes a change recipients option, wherein selection of the change recipients option causes removal of one or more recipients of the message who are accessing the conversation interface on a respective eyewear device from a list of recipients to which the message is directed.

15. The method of claim 14, further comprising:
accessing real-time information associated with each of the recipients of the message;
determining, based on the real-time information, types of devices used by each of the recipients of the message; and
in response to determining, based on the real-time information, the types of devices used by each of the recipients of the message, removing automatically from the list any recipient determined to be using a type of device corresponding to the eyewear device.

16. The method of claim 12, wherein an individual option of the plurality of options includes a delay delivery option, wherein selection of the delay delivery option causes delivery of the message to one or more recipients who are not using an eyewear device currently and saving of the message for any recipient who is currently using the eyewear device.

17. The method of claim 16, further comprising:
accessing real-time information associated with each of the recipients of the message;
determining, based on the real-time information, types of devices used by each of the recipients of the message;
in response to determining, based on the real-time information, the types of devices used by each of the recipients of the message, determining that a given recipient of the message was previously using a respective eyewear device when the message was generated and is currently using a non-eyewear device; and
in response to determining that the given recipient of the message was previously using the respective eyewear device when the message was transmitted and is currently using the non-eyewear device, sending the message to the non-eyewear device of the given recipient.

18. The method of claim 17, further comprising:
prior to determining that the given recipient is using the non-eyewear device and while the given recipient is using the respective eyewear device, generating a notification for presentation to the given recipient indicating that the message has been saved; and
receiving interaction with the notification to cause the message to be displayed on the non-eyewear device of the given recipient.

19. The method of claim 1, further comprising:
determining that the message includes an augmented reality experience associated with facial tracking;
determining that the eyewear device fails to include facial tracking components; and
in response to determining that the message includes the augmented reality experience associated with facial tracking and that the eyewear device fails to include the facial tracking components, causing the alert to be triggered.

20. A system comprising:
a storage device of an eyewear device; and
at least one processor of the eyewear device configured to perform operations comprising:
receiving a request to access a conversation interface of a first conversation comprising messages exchanged between a plurality of participants of the first conversation;
in response to receiving the request, retrieving a plurality of virtual conversation objects associated with the conversation interface;
displaying a first virtual conversation object of the plurality of virtual conversation objects at a first location in three-dimensional (3D) space, the first virtual conversation object comprising a first message of the first conversation;
determining that a second virtual conversation object of the plurality of virtual conversation objects is associated with an earlier timestamp than the first virtual conversation object, the second virtual conversation object comprising a second message of the first conversation;
in response to determining that the second virtual conversation object is associated with the earlier timestamp than the first virtual conversation object, displaying the second virtual conversation object at a second location in three-dimensional (3D) space that is closer to a user of the eyewear device than the first location without overlapping any portion of the first virtual conversation object including the first message of the first conversation, wherein the second virtual conversation object including the second message of the first conversation, is entirely visible and appears at the second location closer to the user simultaneously with the first virtual conversation object including the first message remaining entirely visible and appearing at the first location such that entire contents of the first and second messages and the first and second virtual conversation objects are visible to the user at different 3D locations;
determining that a message generated by a first participant of the plurality of participants of the first conversation is incompatible with being accessed on the eyewear device;
in response to determining that the message generated by the first participant of the first conversation is incompatible with being accessed on the eyewear device, triggering an alert for presentation to the first participant indicating that the message is incompatible with being accessed by the eyewear device and that a second participant of the plurality of participants is currently using the eyewear device; and
prior to sending the message generated by the first participant to the second participant of the plurality of participants, causing the alert to indicate to the first participant that the second participant is currently using the eyewear device, the alert being presented to the first participant in response to determining that the message includes one or more augmented reality elements that are to be generated based on object tracking performed by a target device of the second participant.

21. A non-transitory machine-readable storage medium comprising instructions that, when executed by one or more processors of a machine, cause the machine to perform operations comprising:

receiving a request to access a conversation interface of a first conversation comprising messages exchanged between a plurality of participants of the first conversation;

in response to receiving the request, retrieving a plurality of virtual conversation objects associated with the conversation interface;

displaying a first virtual conversation object of the plurality of virtual conversation objects at a first location in three-dimensional (3D) space, the first virtual conversation object comprising a first message of the first conversation;

determining that a second virtual conversation object of the plurality of virtual conversation objects is associated with an earlier timestamp than the first virtual conversation object, the second virtual conversation object comprising a second message of the first conversation;

in response to determining that the second virtual conversation object is associated with the earlier timestamp than the first virtual conversation object, displaying the second virtual conversation object at a second location in three-dimensional (3D) space that is closer to a user of an eyewear device than the first location without overlapping any portion of the first virtual conversation object including the first message of the first conversation, wherein the second virtual conversation object including the second message of the first conversation, is entirely visible and appears at the second location closer to the user simultaneously with the first virtual conversation object including the first message remaining entirely visible and appearing at the first location such that entire contents of the first and second messages and the first and second virtual conversation objects are visible to the user at different 3D locations;

determining that a message generated by a first participant of the plurality of participants of the first conversation is incompatible with being accessed on the eyewear device;

in response to determining that the message generated by the first participant of the first conversation is incompatible with being accessed on the eyewear device, triggering an alert for presentation to the first participant indicating that the message is incompatible with being accessed by the eyewear device and that a second participant of the plurality of participants is currently using the eyewear device; and prior to sending the message generated by the first participant to the second participant of the plurality of participants, causing the alert to indicate to the first participant that the second participant is currently using the eyewear device, the alert being presented to the first participant in response to determining that the message includes one or more augmented reality elements that are to be generated based on object tracking performed by a target device of the second participant.

\* \* \* \* \*